Jan. 13, 1959  FUMIO TANIGUCHI  2,868,945
ELECTRICALLY HEATED BOILING WATER POT
Filed Aug. 27, 1957

INVENTOR.
BY Fumio Taniguchi
Kurt Kelman
AGENT

United States Patent Office 2,868,945
Patented Jan. 13, 1959

2,868,945
ELECTRICALLY HEATED BOILING WATER POT

Fumio Taniguchi, Ueno-Machi, Tajimi City, Gifu Prefecture, Japan

Application August 27, 1957, Serial No. 680,571

Claims priority, application Japan September 13, 1956

3 Claims. (Cl. 219—44)

This invention provides an electrically heated pot of simple construction and high efficiency in heating whose design is such that the life of the heating element is prolonged and a secure connection to an electric source is assured.

Figure 1:
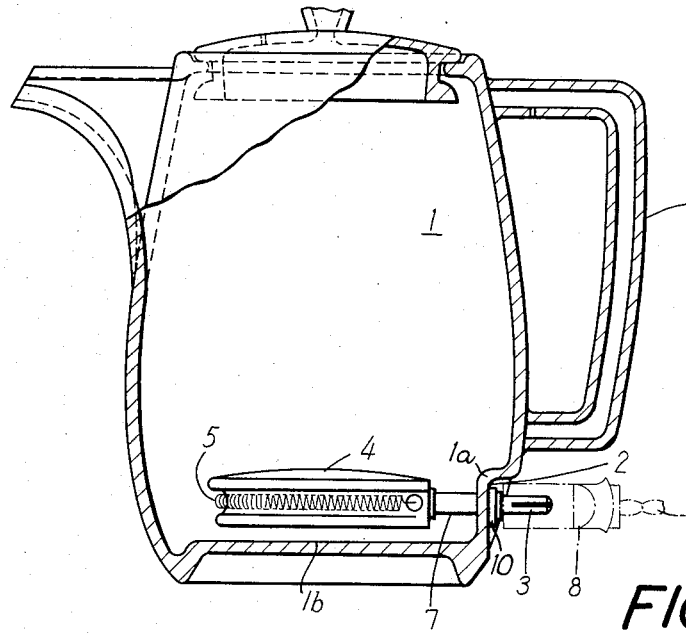
Fig. 1 is a vertical cross-sectional side elevation view of the whole assembly of this invention.
Figure 3:
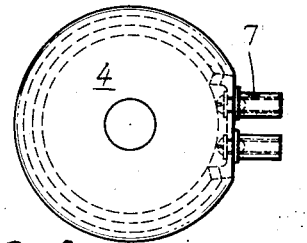
Fig. 3 is a plan view of heater element.
Figures 2, 4:
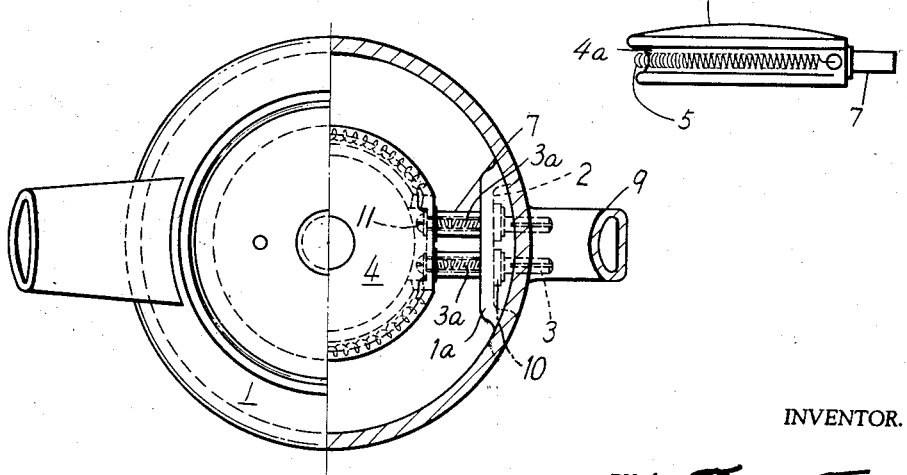
Fig. 2 is a horizontal plan view of Fig. 1 partly sectioned.
Fig. 4 is a side elevation view of heater element.

In Figures 1 and 2, just below handle 9, is shown recess 2 for receiving inserting plug 8, said recess being a part of main body 1. Two pin shaped studs 3 to be used for inserting plug with threaded tips at one end project in said recess. Heating element made of resistance wire 5 is secured in an outer groove in the circumference of insulator 4, which is situated at the inner base surface of main body 1. The terminals of heating element are secured to one end of intermediate pipes 7 through said inner surface of insulator 4, said pipes having both threaded ends, and also having said studs 3 screwed to the other end with threaded tips. According to the foregoing construction, when plug 8, having an electric cord connected to an electric potential source, receives pin shaped studs 3, heating element 5 generates heat sufficient to make the water in the pot boil.

In the conventional pots well known both terminals of the sheathed heater must be affixed to the inner base surface of main body or the contact points, being provided on pedestal having electrical cord, must be connected to the spring contact points, being provided outside base surface of main body, after the terminals of resistance wire are affixed to the inner base surface of main body. In the former affixing method, since the terminals of the sheathed heater should be connected to the inserting plug stud through leading wire with the utmost care due to the moisture-absorbing character of the sheathed heater, the space factor of this device becomes larger and the efficiency of manufacturing of this device decreases. In the latter method, the spring contact points are apt to be worn out and become inferior while it is operated, thereby causing faulty operation; further, it is inconvenient to use this instrument as it usually requires the contact point pedestal to which electrical cord is provided.

In this application, the shape of insulator 4 is of circular shape and heating element made of resistance wire 5 is affixed in the outside recess of said insulator, thereby the resistance wire can be wound without difficulty around insulator, the life of resistance wire is elongated, the resistance wire is concealed from the upper view, and the water in the pot circulates very smoothly from outside to inside of the pot to make water in the pot boil. The upper surface of insulator 4 is flat to enable one to warm a milk bottle, a juice bottle, etc., by putting them directly on it. Affixing the studs to be used for inserting plug to the inner base surface of main body at the position of under part of handle 9 makes it steady and easy to insert or remove said plug while the pot is in use.

As stated above, the apparatus of this invention is assembled steady and conveniently, interchange of every part can easily be performed and consequently mass production may be accomplished, thereby this application can offer a great practical effect which is not obtainable in conventional electrically heated pots.

I claim:

1. An electrically heatable pot comprising a bottom and a side wall, two insulating supporting sleeves mounted in side-by-side relationship in said side wall adjacent said bottom and substantially parallel thereto, said supporting sleeves projecting into the pot and having internal threads at each of their ends, an insulator plate having a circumferential groove, two threaded bolts mounting said insulator plate on the inwardly projecting threaded ends of said supporting sleeves, the insulator plate being adjacent and parallel to the bottom of the pot, a resistance wire heating element arranged in said circumferential groove and attached with its respective ends to said bolts, and two studs screwed into the other internally threaded ends of the support sleeves and adapted to receive a mating electric plug.

2. The pot of claim 1, comprising a handle and having a recess in the side wall under the handle, the studs projecting into said recess.

3. An electrically heatable porcelain pot comprising a bottom, a side wall and a handle on said side wall, the side wall having a recess under the handle, two supporting sleeves mounted in the side wall where it defines the recess, the sleeves being mounted in side-by-side relationship in said side wall adjacent said bottom and substantially aparallel thereto, said supporting sleeves projecting into the pot and having internal threads at each of their ends, an insulator plate having a circumferential groove, two threaded bolts mounting said insulator plate on the inwardly projecting threaded ends of said supporting sleeves, the insulator plate being adjacent and parallel to the bottom of the pot, a resistance wire heating element arranged in said circumferential groove and attached with its respective ends to said bolts, and two studs screwed into the other internally threaded ends of the support sleeves and adapted to receive a mating electric plug.

References Cited in the file of this patent

UNITED STATES PATENTS 2,759,091    Kolberg _____ Aug. 14, 1956

FOREIGN PATENTS 686 of 1926    Australia _____ June 22, 1926
343,211    Great Britain _____ Feb. 19, 1931